United States Patent
Baikov et al.

(10) Patent No.: US 11,720,269 B1
(45) Date of Patent: Aug. 8, 2023

(54) PREDICTIVE BLOCK STORAGE SIZE PROVISIONING FOR CLOUD STORAGE VOLUMES

(71) Applicant: ZESTY TECH LTD., Tel Aviv-Jaffa (IL)

(72) Inventors: Alexey Baikov, Bat Yam (IL); Maxim Melamedov, Netanya (IL); Alon Oshri Kadashev, Tel Aviv (IL); Michael Amar, Yerucham (IL)

(73) Assignee: ZESTY TECH LTD., Tel-Aviv (IL)

( * ) Notice: Subject to any disclaimer, the term of this patent is extended or adjusted under 35 U.S.C. 154(b) by 0 days.

(21) Appl. No.: 17/713,947

(22) Filed: Apr. 5, 2022

(51) Int. Cl.
    *G06F 3/06* (2006.01)
    *G06F 9/50* (2006.01)
    *G06N 20/00* (2019.01)

(52) U.S. Cl.
    CPC .......... *G06F 3/064* (2013.01); *G06F 3/0604* (2013.01); *G06F 3/067* (2013.01); *G06F 9/5016* (2013.01); *G06F 9/5077* (2013.01); *G06N 20/00* (2019.01)

(58) Field of Classification Search
    CPC ........ G06F 3/064; G06F 3/0604; G06F 3/067; G06F 9/5016; G06F 9/5077; G06N 20/00
    USPC ................................................. 711/164, 163
    See application file for complete search history.

(56) References Cited

U.S. PATENT DOCUMENTS

| | | | |
|---|---|---|---|
| 2012/0079497 A1* | 3/2012 | Gangemi | G06F 9/5011 718/104 |
| 2013/0325776 A1* | 12/2013 | Ponulak | G06N 20/00 700/250 |
| 2020/0364189 A1* | 11/2020 | Lee | G06F 21/64 |
| 2021/0318824 A1* | 10/2021 | Cain | G06F 3/0644 |

OTHER PUBLICATIONS

Model Training (Year: 2022).*

* cited by examiner

*Primary Examiner* — David Yi
*Assistant Examiner* — Zubair Ahmed
(74) *Attorney, Agent, or Firm* — Pearl Cohen Zedek Latzer Baratz LLP (57) ABSTRACT

Systems and methods for managing computer block storage for a computer application include calculating an optimal required block storage capacity based on the storage needs of the application; provisioning block storage of the optimal capacity; receiving at least one block storage usage metric of the application; using a machine learning based model, trained on historic data of at least one application, to identify at least one future time at which a block storage capacity adjustment is required; and adjusting the block storage capacity within a time of the future time at which the block storage capacity adjustment is required.

17 Claims, 6 Drawing Sheets

PREDICTIVE BLOCK STORAGE SIZE PROVISIONING FOR CLOUD STORAGE VOLUMES

FIELD OF THE INVENTION

The present invention relates generally to predicting trends in data storage usage, in particular to providing data storage capacity adjustment responsive to those predictions.

BACKGROUND OF THE INVENTION

Many applications rely on storing data online on "the cloud". The cloud may refer to computer servers which are accessed over the internet without a direct wired connection. Computer systems engineers face a continuous challenge of predicting and planning the required storage capacity for different cloud-based applications. Traditionally, ongoing maintenance of cloud-based applications (performed manually by cloud engineers) requires constant monitoring and optimization cycles to ensure stability and performance around the clock. A common practice is storage over-provisioning, taking more resources than are actually needed. Storage over-provisioning involves making more storage available than can reasonably be expected to be used, thus minimizing the risk of data loss or crashes; it is, however, an inefficient technique leading to poor resource utilization and inflated cloud budgets. Such decisions are taken to support unpredictable business demand, and as cloud block storage does not automatically adjust itself to the constantly changing application needs, mistakes in estimating the required capacity may lead to application crashes, data loss, poor resource utilization, and waste of human efforts.

In traditional IT (information technology), "thin provisioning" is a mechanism that applies to large-scale centralized computer disk-storage systems, storage area networks (SANs), and storage virtualization systems. This concept allows a large number of storage consumers (e.g. virtual machines) to statically request storage blocks from the central storage system. However only the used blocks are actually written. Thin provisioning offers more efficiency where the number of resources used is much smaller than allocated.

The cloud's main promise is usage based elasticity, and while some fields do provide an elasticity model that can support modern development, cloud storage continues to utilize decades old concepts which in turn inflict negative effects on developers and cloud engineers. Cloud block storage volumes can only be increased in size on some clouds, and few cloud storage providers allow the customer to decrease their storage volume size. On top of that, the developer using the cloud is expected to predict the needed storage size.

There is therefore a need for storage provisioning which is adaptive to specific application needs.

SUMMARY

Embodiments of the invention may include a method for managing computer data block storage for a computer application, the method including: calculating an optimal required block storage capacity based on the storage needs of the application; provisioning block storage of (e.g. defined by, equal to, etc.) the optimal capacity, thereby providing a safe buffer; receiving at least one block storage usage metric of the application for a predetermined period of time; using a machine learning based predictive model, trained on historic data of time periods of at least one application, to identify at least one future time at which a block storage capacity adjustment is required; and adjusting the block storage capacity within a predetermined time of the future time at which the block storage capacity adjustment is required.

According to some embodiments, the block storage capacity adjustment includes: identifying, by the predictive model, at least one future time at which the application requires less block storage than is currently provisioned; and removing a surplus capacity of block storage within a predetermined time of the future time at which the surplus storage is not required.

According to some embodiments, removed surplus block storage for the application is used as additional block storage for a second application.

According to some embodiments, the block storage capacity adjustment includes: identifying, by the predictive model, at least one future time at which the application requires more block storage than is currently provisioned; and provisioning, from at least one block storage provider, a required additional capacity of block storage within a predetermined time of the future time at which the required storage is required.

According to some embodiments, the step of provisioning the required additional capacity of block storage includes: comparing a block storage cost among more than one block storage provider; and provisioning block storage from the block storage provider offering the lowest cost for the required block storage.

According to some embodiments, the block storage is cloud block storage.

According to some embodiments, the method includes predicting, by the predictive model, a response time of at least one block storage provider to fulfil a request for block storage capacity adjustment.

According to some embodiments, block storage includes a plurality of storage blocks associated with at least one virtual block storage volume, wherein the plurality of storage blocks comprises at least one storage block of a first capacity, and at least one storage block of a capacity different to the first capacity, and wherein the at least one virtual block storage volume is distributed over one or more physical disks.

According to some embodiments, a block storage capacity adjustment includes removing surplus block storage starting with the storage block containing the least stored data based on a file system analysis of the application indicating which storage blocks contain data which is no longer required.

According to some embodiments, the machine learning based predictive model is one of: a neural network, or a reinforcement learning model.

According to some embodiments, the machine learning based predictive model is trained to predict behavior trends of the usage of storage data by the application based on a training set of time periods and data usage metrics corresponding to the set of time periods.

According to an embodiment, there is provided a method for managing block storage for an application, the method including: receiving at least one block storage usage metric of the application for a predetermined period of time; using a machine learning based predictive model, trained on historic data of time periods for at least one other application, to identify at least one future time at which a block storage adjustment is required; and adjusting a total size of the block storage within a predetermined time of the future time at which the block storage adjustment is required.

According to some embodiments, an initial minimum block storage size is provided based on the minimum block storage needs of the application.

According to some embodiments, the block storage adjustment includes: identifying, by the predictive model, at least one future time at which the application requires less block storage than is currently provisioned; and removing an excess amount of block storage within a predetermined time of the future time at which the excess storage is not required.

According to some embodiments, the block storage adjustment includes: identifying, by the predictive model, at least one future time at which the application requires more block storage than is currently provisioned; and creating a required additional size of block storage within a predetermined time of the future time at which the required storage is required.

According to an embodiment, there is provided a system for managing block storage for an application, the system comprising: a memory; and a processor, wherein the processor is configured to: receive at least one block storage usage metric of the application for a predetermined period of time; apply a machine learning based predictive model to identify at least one future time at which a block storage capacity adjustment is required; and adjust the block storage capacity within a predetermined time of the future time at which the block storage capacity adjustment is required.

According to some embodiments, the processor is configured to: identify at least one future time at which the application requires less block storage than is currently provisioned; and remove a surplus capacity of block storage within a predetermined time of the future time at which the surplus storage is not required.

According to some embodiments, the processor is configured to: identify at least one future time at which the application requires more block storage than is currently provisioned; and provide a required additional capacity of block storage within a predetermined time of the future time at which the required storage is required.

According to some embodiments, the machine learning based predictive model is trained on historic data of time periods for at least one other application.

According to some embodiments, the processor is configured to perform at least one of: copy-on-write of data, or RAID-0 disk striping.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

As used herein "storage" is generally intended to refer to data computer data storage, as opposed to, for example, storage such as a shipping container. Cloud block storage services are a highly complex discipline, with various tier options and pricing plans to fit almost any need. The complexity is so great, that some companies prefer to pay 10-20 times the cost for the storage they actually need simply because they picked a suboptimal storage plan.

Cloud blocks/volumes may refer to virtual storage devices that can be attached to virtual machines. A virtual machine (VM) may be the virtualization or emulation of a computer system, and may provide the emulated functionality of a physical computer. Depending on the cloud vendor's offerings, cloud volumes can have different service level agreement (SLA), performance and pricing. Typically vendors will limit the maximum volume size, new volume creation rate, and ability to extend the volume size while in-use. Furthermore, virtual machines have their own limitations on the number of volumes that can be attached. Cloud volume may be an array of storage blocks that the user reserves for a virtual machine to use. The filesystem of the virtual machine may be responsible for managing the distribution of data blocks and their allocation on the block storage volume, hence an ordinary block device (e.g. a virtual machine with associated block storage) may be unable to decrease the number of blocks since it is unaware of the filesystem allocation. Removing any block without taking filesystem layout into consideration may result in data loss and filesystem corruption. Engineering teams have to take all of the above constraints into account while predicting the required disk size to fulfill the immediate and future demand for each application or microservice deployed to the cloud.

Real world applications have different storage requirements during runtime that can be impacted by the application internal logic (e.g. larger dataset to process) or externally by elements such as the business peak hours or change in the input data. Block storage volumes require constant monitoring and alerting solutions to collect and analyze usage metrics, such as free and used space, and notify when capacity is reaching a predefined threshold.

Embodiments of the present invention include a predictive cloud storage management system that automatically adjusts cloud volume capacity to meet application storage demand in real time by aggregating multiple cloud volumes (e.g. block storage devices) into a unified filesystem. A decision making engine, which may include a machine learning based model, may ensure that an application has the required amount of storage space at any moment while maintaining the highest possible level of resource utilization.

Figure 1:
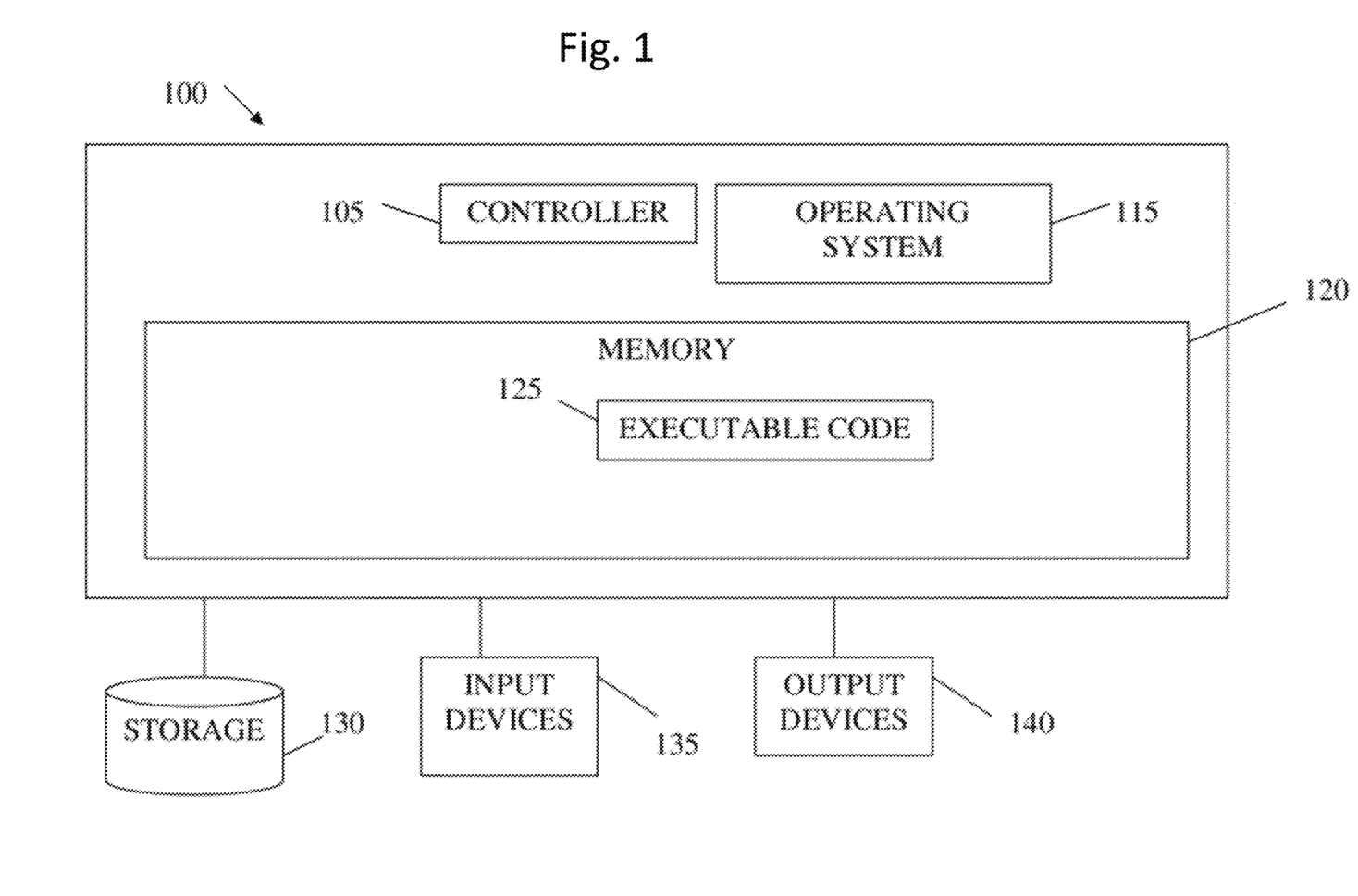
FIG. 1 is a block diagram of a system according to an embodiment of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. At least a portion of Memory 120 may include data storage housed online on the cloud. Memory 120 may be or may include a plurality of different memory units. Memory 120 may store for example, instructions (e.g. code 125) to carry out a method as disclosed herein. Memory 120 may use a datastore, such as a database.

Executable code 125 may be any application, program, process, task, or script. Executable code 125 may be executed by controller 105 possibly under control of operating system 115. For example, executable code 125 may be, or may execute, one or more applications performing methods as disclosed herein, such as a machine learning model, or a process providing input to a machine learning model. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105. Storage 130 may include cloud storage. Storage 130 may include storing data in a database.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (MC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 2:
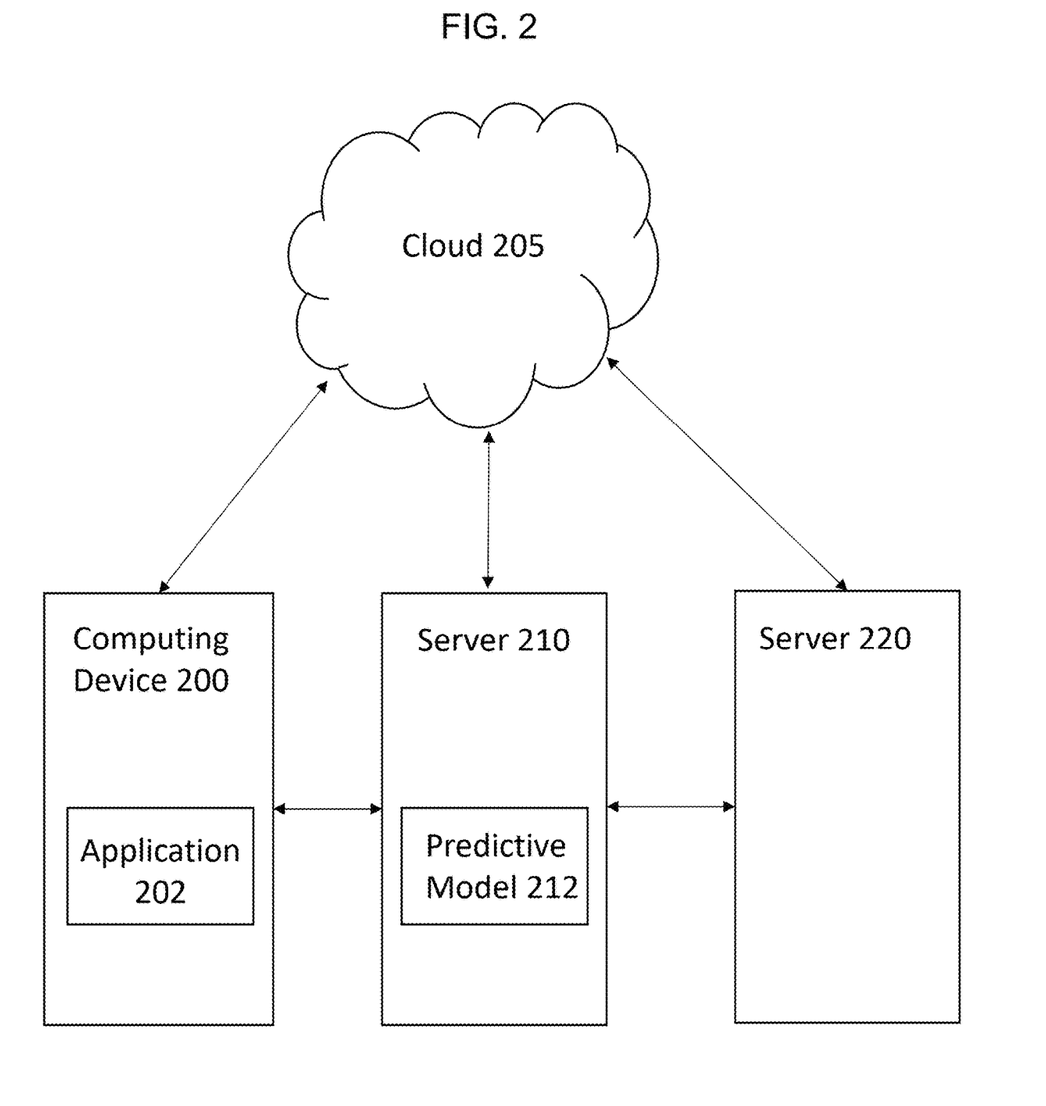
FIG. 2 is a block diagram of a system according to an embodiment of the present invention.

FIG. 2 shows a general environment in which some embodiments of the present may operate. Computing device 200 may be a computing device according to FIG. 1 and may be, for example, a personal computer, tablet, smartphone etc. Computing device 200 may run application 202. Application 202 may be an application which uses cloud-based functionality and/or storage. Application 202 may communicate with cloud 205 by way of computing device 200.

Server 210 may be a computing device according to FIG. 1. Server 210 may be responsible for running procedures according to embodiments of the present invention, for example, server 210 may manage block storage on cloud 205 for application 202 by executing methods disclosed herein. Server 210 may facilitate a software as a service (SAAS) product according to embodiments of the present invention.

Server 210 may include a predictive model 212. Predictive model 212 may be a machine learning based predictive model, for example a reinforcement learning based model, or neural network. Predictive model 212 may be trained on historic data in order to make predictions, for example in order to make predictions about upcoming data storage needs of application 202. Predictive model 212 may obtain storage usage data (e.g. one or more storage usage metrics) from application 202 by communicating via server 210 with computing device 200 running application 202.

Server 220 may be a server of a storage provider, for example a third party storage provider. Server 220 may be a computing device according to FIG. 1. Server 220 may include a physical storage system, such as a plurality of physical disk drives. Server 220 may provide cloud block storage, for example virtual block storage volumes in a virtual layer over the physical disk drives.

Server 210 may communicate with server 220, for example to request the provision of additional block storage to cloud 205 for application 202. Provisioning may mean, for example, at least one of purchasing, creating, reserving and/or assigning a portion of data storage for use by the cloud-based application, and may include provisioning data storage from a third party data storage provider. Server 210 may communicate with server 220 to request the release/removal of block storage from cloud 205 for application 202.

In some embodiments, server 210 may generate and provide storage on cloud 205 for application 202 independently of a third party storage provider, e.g. an operating entity of server 220. Server 210 may generate or remove storage for application 202 automatically in response to predictions made by predictive model 212.

A machine learning model, such as machine learning based predictive model 212, may include a neural network (NN) and may receive input data. According to some embodiments of the invention, the input data may be a time series, for example a discrete time series of storage data usage measurements or metrics. A machine learning model according to embodiments of the invention may output predictions calculated, estimated, or derived on the basis of function approximation and/or regression analysis.

A neural network may include neurons or nodes organized into layers, with links between neurons transferring output between neurons. Aspects of a NN may be weighted, e.g. links may have weights, and training may involve adjusting weights. A positive weight may indicate an excitatory connection, and a negative weight may indicate and inhibitory connection. A NN may be executed and represented as formulas or relationships among nodes or neurons, such that the neurons, nodes, or links are "virtual", represented by software and formulas, where training or executing a NN is performed, for example, by a conventional computer or GPU (such as computing device 100 in FIG. 1).

Neural networks or connectionist systems are computing systems inspired by biological computing systems, but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers.

NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

In practice, a NN, or NN learning, can be simulated by one or more computing nodes or cores, such as generic central processing units (CPUs, e.g. as embodied in personal computers) or graphics processing units (GPUs such as provided by Nvidia Corporation), which can be connected by a data network. A NN can be modelled as an abstract mathematical object and translated physically to CPU or GPU as for example a sequence of matrix operations where entries in the matrix represent neurons (e.g. artificial neurons connected by edges or links) and matrix functions represent functions of the NN.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of compute power, on the order of 10s or even 100s of Teraflops, or a large set of cores. On modern GPUs this can be done using 4,000-5,000 cores.

According to some embodiments, the machine learning based predictive model may be a reinforcement learning based model. Reinforcement learning algorithms may be based on dynamic programming techniques, and may include using a Markov decision process (MDP) such as a discrete-time stochastic control process. Reinforcement learning models may be advantageous over supervised learning models because they do not require labelled input data, and may be used where constructing an exact mathematical model is infeasible.

According to some embodiments, the machine learning based predictive model may be trained to predict behavior trends of the usage of storage data by the application based on a training set of time periods and data usage metrics corresponding to the set of time periods.

Figure 3:
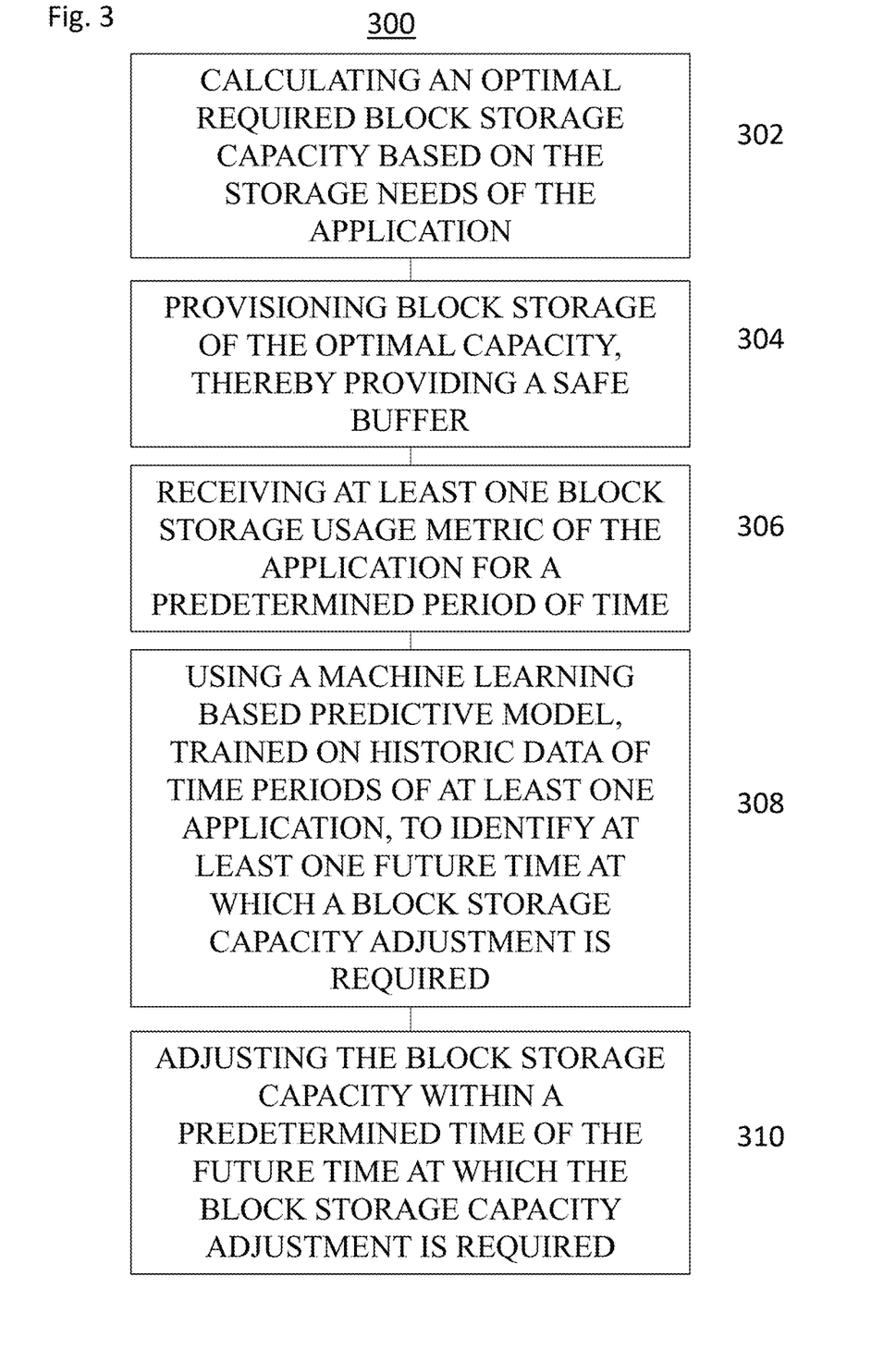
FIG. 3 is a flowchart of a method according to an embodiment of the present invention.

FIG. 3 shows a flowchart of a method 300 for managing block storage for an application according to some embodiments of the present invention. An application may be, for example, a piece of software executing on a computing device (e.g. computing device 100) and may also be referred to as an app. An app may generate data and may store this data on the cloud. A user of the app may have an agreement with a cloud storage provider (e.g. Amazon Web Services, the Microsoft Azure service) to provide a fixed amount of data storage. The agreement may work as a subscription model, for example with a monthly fee paid to keep the storage in use. Additional storage may be purchased, but this additional amount of storage may be far greater than required and money may be wasted on unused storage.

A method 300 according to embodiments of the invention may include calculating (302) an optimal required block storage capacity based on the storage needs of the application. Block storage may be, for example, a unit of data storage of a certain size, representing a capacity of data which can be stored in that block, e.g. in terms of megabytes (Mb), gigabytes (Gb), terabytes (Tb) etc. A plurality of block storage units may constitute a storage block, e.g. a storage block may include one or more units of block storage. Storage blocks, and thus block storage may be virtual volumes of storage associated with one or more virtual machines (VMs). A virtual machine is the virtualization or emulation of a computer system based on computer architectures. VMs may provide the functionality of a physical computer.

Calculating (302) an optimal required block storage capacity based on the storage needs of the application may involve, for example, determining the greatest lower bound of data storage required by the application. To give an analogy, a car with a top speed of 100 miles per hour may require one hundred miles of road for one hour of conventional (e.g. not off-road) travel. If the car travels at 30 mph, it will only require 30 miles of road. Accordingly, 100 miles of road is the greatest of the lower bounds. Storage needs of the application may be governed by the running processes (various applications, services, databases etc.) which use filesystems to create and delete files and/or folders according to their internal logic (a database could store each table as a separate file, for example). When a file is created, the filesystem is responsible for allocating the required amount/number of blocks on the block storage so that the file can be successfully written. The filesystem determines the size of a single block (typically, the default block size is 4 kb).

Method 300 may include provisioning (304) block storage of, equal to or defined by the optimal capacity, thereby providing a safe buffer. Provisioning may include obtaining storage from a third party storage provider, for example by reserving or assigning a portion of storage. Alternatively, provisioning may include creating the required storage. Provisioning an optimal capacity of blocks (e.g. the requested cloud volume capacity from a cloud vendor), may be determined by an amount of blocks already used (e.g. used by the filesystem to store the data) and a safe buffer. The used capacity is typically measured in kilobytes but is not limited to this alone. The capacity requested from the cloud vendor is typically measured in gigabytes, but is not limited to this alone. A safe buffer may mean the maximum write speed of a block storage device or plurality of block storage devices combined in stripe. A safe buffer may determine how many blocks can be written in a period of time (120 MB/sec, for example), to guarantee enough free blocks even in case the data will be written at the maximum possible speed. In other words, a safe buffer may refer to an amount of storage required to allow the app to run at full capacity if needed, as in the above car and road example: the app may not utilize all the provided storage at once, but there may be a sufficient amount provided to cover such a case if required.

Method 300 may include receiving (306) at least one block storage usage metric/measurement of the application, potentially for a predetermined period of time (e.g. receiving the number of write operations for the last 3 hours). A block storage metric may be an indicator of how the application is using the provided storage. Examples of block storage metrics may be: input/output operations per second (IOPS); read/write bandwidth e.g. in kb/s; read/write throughput e.g. in operations per second; average queue length e.g. in terms of number of operations; average read/write size e.g. in kb per operation; and average read/write latency e.g. in ms per operation. The predetermined period of time may be any time frame or period suitable to obtain a meaningful insight into how the application is using the provided storage, for example a sample of used capacity and free capacity metrics may be enough to determine if a safe buffer is maintained and there is no potential risk of running out of free space.

Method 300 may include using (308) a machine learning based (e.g. predictive) model, trained on, for example historic data of time periods of at least one application and/or storage usage, to identify at least one future time or period at which a block storage capacity adjustment/change is required. The machine learning based predictive model may be for example a reinforcement learning model and/or neural network. The historic data may represent past (e.g. immediate past) usage of storage by the application or of other applications. Historic data may also include used capacity, total capacity and free capacity measured, for example, in kilobytes. For example, applications in similar sectors (e.g. financial) may have similar storage usage trends quantified by one or more block storage usage metrics, and so previous data from one application may be useful in predicting storage usage behavior trends for other applications.

A future time or period at which block storage capacity adjustment or change is required may be a predicted upcoming time at which the application requires more or less storage than is currently provisioned. For example, the machine learning based predictive model may identify that on weekends less data is generated which needs to be stored. Accordingly, an upcoming weekend may be identified by embodiments of the invention as a future time at which less data storage is required. Storage may then be reduced automatically in response to the prediction, for example by removing a block storage unit, as described herein.

Method 300 may include adjusting (310) the block storage capacity within a predetermined time of the future time at which the block storage capacity adjustment is required. For example, if the machine learning based predictive model predicts that the application will require more storage at 14:00 (e.g. the future time), embodiments of the invention may make an adjustment at 13:30 (e.g. within a predetermined 30 minute timeframe of the future time of 14:00) in preparation for the time at which the change in storage requirements is predicted to happen, in this example 14:00.

A block storage capacity adjustment may include identifying, e.g. by the predictive model, at least one future time at which the application requires less block storage than is currently provisioned. A surplus capacity of block storage may then be removed within a predetermined time of the future time at which the surplus storage is not required. Removed surplus block storage for the application (e.g. first application) may be used as additional block storage for a second (e.g. different) application.

Alternatively, or complementarily, a block storage capacity adjustment may include identifying, e.g. by the predictive model, at least one future time at which the application requires more block storage than is currently provisioned, and embodiments of the invention may accordingly set to provisioning, e.g. from at least one block storage provider, a required additional capacity of block storage within a predetermined time of the future time at which the required storage is required. In some embodiments, storage is created independently, e.g. without engaging and purchasing storage from a third party cloud block storage provider.

Accordingly, embodiments of the present invention may dynamically adjust (e.g. increase and/or decrease) a storage capacity of an application in response to predicted future needs/requirements. Embodiments of the invention may add or remove storage in good time prior to the time at which such adjustment is required.

Embodiments of the present invention may include predicting, e.g. by the predictive model, a response time of at least one block storage provider to fulfil a request for block storage capacity adjustment. For example, data obtained from a block storage provider on the time taken to make storage available (e.g. publicly available in a Frequently Asked Questions "FAQ" or on request as part of a quote) may be used by the model (or computing device executing the model) to improve predictions by factoring this response time into the prediction. In this way, embodiments of the invention may ensure that any potential delays in adding or offloading storage are factored into the scheduling of adjusting the storage in sufficient time of the time at which the adjustment is required.

According to some embodiments, provisioning a required additional capacity of block storage may include comparing a block storage cost among more than one block storage provider and provisioning block storage from the block storage provider offering the lowest cost for the required block storage. In this way, embodiments of the invention may take into account a cost analysis from different providers in making the storage available, and thereby allow for the most economically viable option. In some embodiments there may a reimbursement/refund for unused/removed storage.

According to some embodiments, the block storage may include a plurality of storage blocks associated with at least one virtual block storage volume, wherein the plurality of storage blocks includes at least one storage block of a first capacity, and at least one storage block of a capacity different to the first capacity. For example, a first block of 1 Tb and another block of 50 Gb. The at least one virtual block storage volume may be distributed over one or more physical disks (e.g. included in the physical storage system 422 of FIG. 4A).

A block storage capacity adjustment may include, according to some embodiments, removing surplus block storage starting with the storage block containing the least amount of stored data based on a file system analysis of the application indicating which storage blocks contain data which is no longer required. For example, among blocks storing 1

Gb, 5 Gb and 10 Gb of data, the block storing 1 Gb of data contains the least amount of stored data, because 1<5<10. A file system analysis may be useful in identifying how data has been allocated within the storage blocks, and may prevent removal of a storage block which contains stored data. As is known in the art, the writing of data at the physical layer (e.g. on a physical disk) is random. Accordingly, virtual storage over a physical layer may also result in data being stored randomly to the available storage blocks. Storage blocks of differing sizes may therefore have a different distribution of stored data because, for example, a "larger" storage block has more "places" to store data and so it is more likely (e.g. higher probability) that data will be stored in at least one place in the "larger" storage block, as compared to a "smaller" storage block which has fewer places to store data.

Figure 4A:
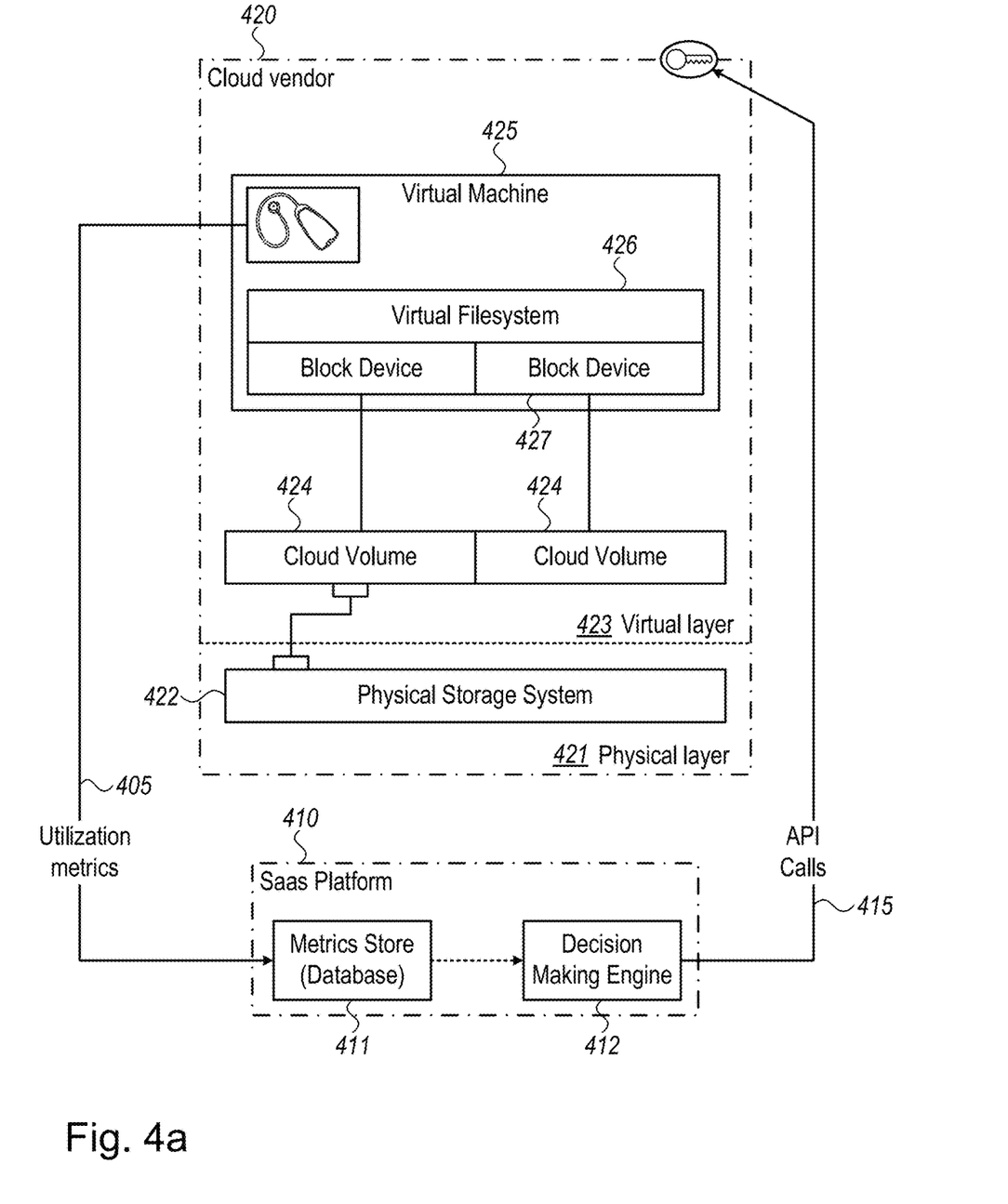
FIG. 4A is a diagram of a system according to an embodiment of the present invention.

FIG. 4A shows how embodiments of the invention, for example as a SAAS platform 410, may interact with a cloud vendor (e.g. a block storage provider) 420.

Cloud vendor 420 (which may operate as a server such as server 220, and/or may be a computing device such as is shown in FIG. 1) may provide cloud volume/block storage and may accommodate a physical layer 421. Physical layer 421 may include a physical storage system 422. A virtual layer 423 may exist over physical layer 421. Virtual layer 423 may include one or more cloud volumes 424 and one or more virtual machines 425. Virtual machine 425 may include a virtual filesystem 426, which may include one or more block devices 427. A cloud-based application requiring cloud-based storage as discussed herein, may be executed on virtual machine 425. Cloud vendor 420 may "house" the provisioned storage volumes discussed herein, for example by storing data on cloud volumes 424 of a virtual layer 423 supported by a physical storage system 422 of a physical layer 421. A safe buffer of data storage may be provided by providing/provisioning a plurality of cloud volumes 424, of a total storage size equal to or greater than an optimal capacity based on the storage needs of the application.

To achieve efficient application continuity and stability, filesystem awareness may be critical. A SAAS platform 410, according to embodiments of the invention, may analyze virtual filesystem 426 when making storage adjustment decisions based on predictions of upcoming storage usage, e.g. by receiving at least one block storage usage metric of the application.

SAAS platform 410 may execute on a computing device, such as computing device 100 of FIG. 1. SAAS platform 410 may include a metrics collector 405, for example executable code designed to collect block storage utilization metrics. Metrics collector 405 may be deployed on (e.g. interact with) virtual machine 425 to measure application specific disk usage and report these data to a centralized metrics store 411, such as a database. Utilization metrics may include data, for example block storage usage data, on how the app is using cloud storage.

SAAS platform 410 may also include a decision making engine/module 412. Decision making engine 412 may include a machine learning based predictive model. Metrics collected by metrics collector 405 and stored in metrics store 411 may be processed in real-time by decision making engine 412, for example, on the order of milliseconds or sometimes microseconds.

Decision making engine 412 may generate management actions (e.g. a block storage capacity adjustment) based on the received usage metrics and may evaluate them in light of the physical speed limitations of the cloud volume (e.g. write throughput and IOPS) dictated by the block storage type (e.g. Solid State Drive "SSD") and cloud vendor's application programming interface (API) response times in a specific datacenter. This approach may fuse a set of execution plans with named actions to be taken. Actions may be API calls 415, for example:

Add disk—which translates to a cloud API call to create a new block storage volume, attach it to a virtual machine, such as virtual machine 425, and a filesystem call to extend the filesystem redundant array of independent disks (RAID) strip to make the newly added space available;

Remove disk—which translates to a filesystem call to distribute used data blocks between the other block device(s). Once all blocks are migrated, the disk may be detached from the virtual machine using a cloud API call;

Cancel disk removal—which translates into a filesystem call to abort running the disk removal process;

Expand disk—which translates into a cloud API (if available) and once the extension completes, a filesystem call to extend the filesystem triggered; and Shrink—which translates into a filesystem call to initiate gradual filesystem reduction and block defragmentation process.

The following filesystem capabilities may be used with embodiments of the invention: Copy-on-write of data and metadata; built-in RAID-0 (disk striping) with the ability to attach and detach block devices online; and online resizing and defragmentation. Embodiments of the invention may make use of a b-tree file system (btrfs).

Figure 4B:
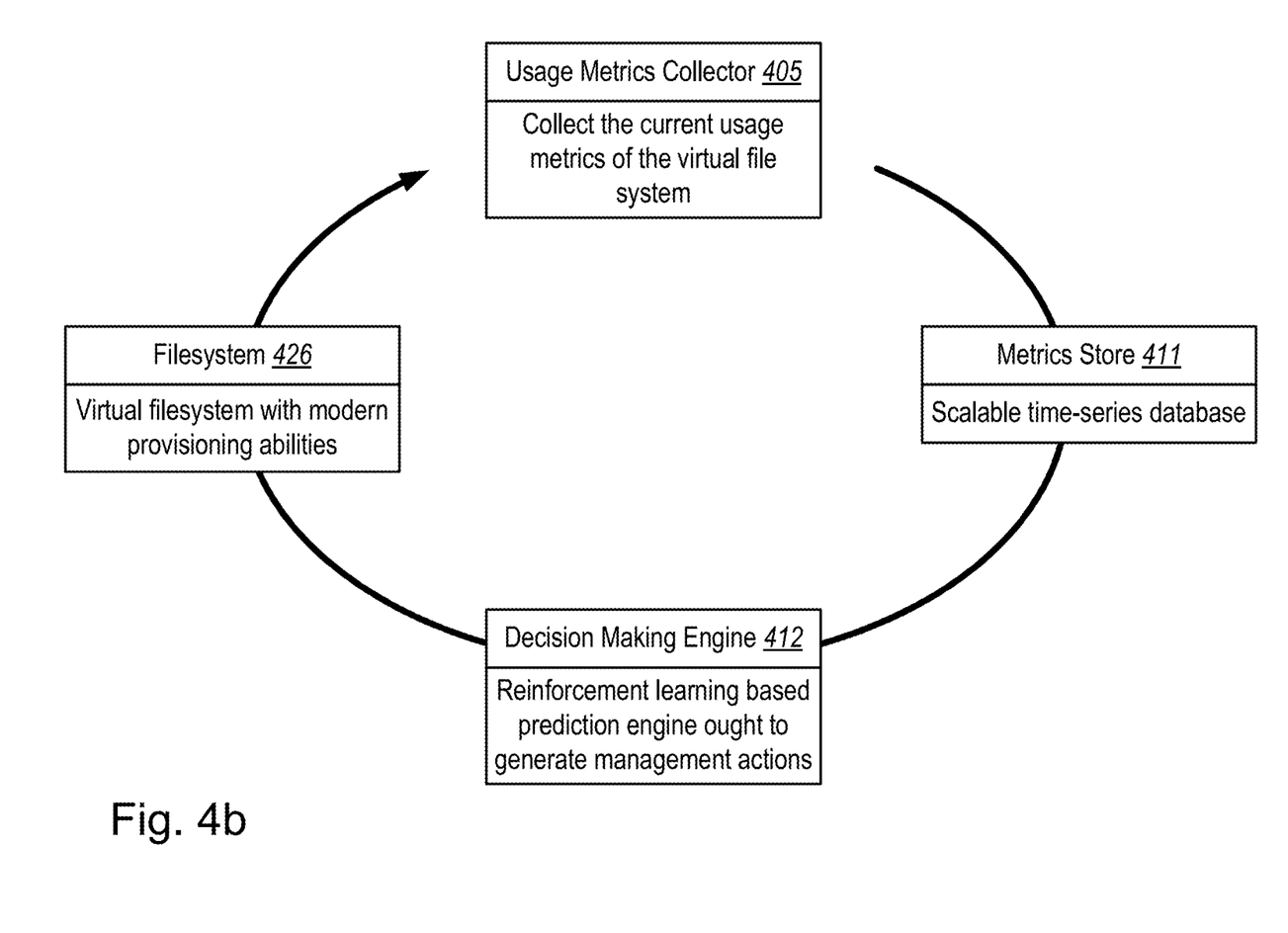
FIG. 4B is a diagram of a system according to an embodiment of the present invention.

FIG. 4B shows an interdependence of elements of FIG. 4A. For example, a usage metrics collector, such as metrics collector 405 may collect the current usage metrics of the virtual file system (e.g. virtual file system 426). Metrics collected by metrics collector 405 may be stored in metrics store 411, which may be a scalable time-series database, e.g. a database containing time series data which can be added to/scaled up with further datapoints collected at future times. Decision making engine 412 may use the metrics store 411 to make decisions, such as management actions. Decision making engine 412 may be a reinforcement learning based prediction engine. Virtual filesystem 426 may be adjusted (e.g. by having its storage increased and/or decreased) by actions taken by decision making engine 412. Virtual filesystem 426 may be equipped with modern provisioning abilities such as copy-on-write of data and RAID-0 disk striping. Virtual filesystem 426, potentially adjusted as described herein, may be continuously monitored by metrics collector 411, and thus a feedback loop may be generated providing continual monitoring, analysis, decision and adjustment of storage use and provisioning.

Figure 5:
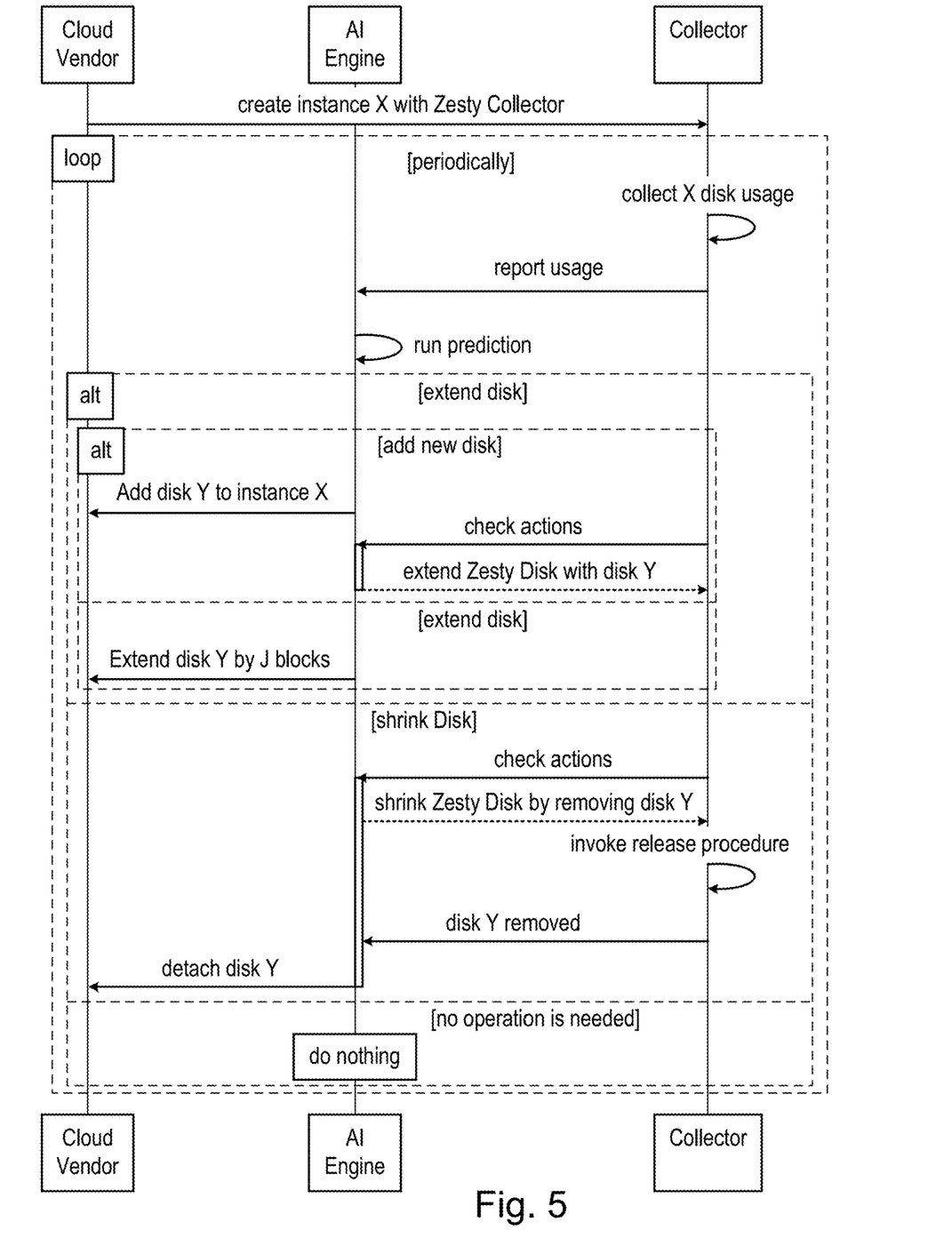
FIG. 5 is a sequence diagram according to embodiments of the present invention.

FIG. 5 shows a sequence diagram according to an embodiment of the invention. A sequence diagram such as that in FIG. 5 may show in schematic fashion a series of operations and calls (e.g. API calls) between different entities involved in the process, such as a cloud vendor, an AI engine (e.g. decision engine 412 and/or machine learning based predictive model) and a collector (e.g. metrics collector 411).

In an initial stage, the cloud vendor may create an instance (e.g. instance "X") with a collector. For example, a metrics collector may be installed or otherwise created to monitor a virtual filesystem of an application running with the cloud vendor. The collector may be referred to under a trade name, for example a "Zesty collector" as may be provided by Zesty tech LTD.

The collector may periodically (e.g. every ten minutes), or alternatively continuously, collect disk usage metrics e.g. from disk X. The collector may report these usage data to the AI engine. The AI engine may run a prediction. On the basis of the prediction, the AI engine may make a decision.

For example, the AI engine may decide to extend the disk e.g. if the prediction estimates that more storage is required than is currently provisioned. The AI engine may instruct the cloud provider to extend a disk, such as a disk Y, by J blocks, for example by three blocks of 10 Gb.

The AI engine may decide to add a new disk on the basis of the prediction. For example, the AI engine may instruct the cloud provider to add a disk, such as a disk Y, to disk X. The collector may check the actions taken and may extend the analysis of the filesystem (which may be referred to as a "Zesty disk") to include an analysis of disk Y.

Alternatively, the AI engine may decide to shrink disk space on the basis of the prediction. A disk, such as a disk Y, may be removed a release procedure may be invoked. The collector may thus stop monitoring disk Y. The cloud provider may detach disk Y.

In some situations, the AI engine may, on the basis of its prediction for upcoming storage needs, decide that no action/operation needs to be taken, and may correspondingly do nothing until receiving the next set of usage metrics.

Embodiments of the present invention may be applicable to any cloud that supports the notion of attaching block storage volumes to a virtual machine, regardless of whether the cloud is a public cloud. In particular, embodiments of the present invention may be applied to private, government, and even on-premises clouds, and without limitation to other cloud types not discussed here.

Embodiments of the invention may have the advantage of eliminating the need for manual capacity planning by cross-referencing application storage usage pattern, cloud volume limitations dictated by the volume type (e.g. write throughput and IOPS), and the cloud provider's response times in order to make a prediction of the needed storage capacity. Embodiments may automatically provision or shrink that capacity while making sure to maintain a safe buffer, thereby guaranteeing application stability, availability, and performance whilst relieving engineers from manually managing storage volumes and reducing storage costs.

Embodiments of the invention may improve the technologies of computer automation, big data analysis, and computer use and automation analysis by using specific algorithms to analyze large pools of data, a task which is impossible, in a practical sense, for a person to carry out.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method for managing computer block cloud volume storage for a computer application, the method comprising:
   calculating an optimal required cloud volume block storage capacity based on the storage needs of the application;
   provisioning cloud volume block storage of the optimal capacity;
   receiving at least one cloud volume block storage usage metric of the application;
   using a reinforcement learning based predictive model, trained on historic data of at least one application, to identify at least one future time at which a cloud volume block storage capacity adjustment is required;
   predicting, by the reinforcement learning based predictive model, an application programming interface (API) call response time of at least one cloud volume block storage provider to fulfil a request for cloud volume block storage capacity adjustment at a specific datacenter; and
   adjusting the cloud volume block storage capacity within a time of the future time at which the cloud volume block storage capacity adjustment is required.

2. The method of claim 1, wherein the cloud volume block storage capacity adjustment comprises:
   identifying, by the model, at least one future time at which the application requires less cloud volume block storage than is currently provisioned; and
   removing a surplus capacity of cloud volume block storage within a time of the future time at which the surplus storage is not required.

3. The method of claim 1, wherein removed surplus cloud volume block storage for the application is used as additional cloud volume block storage for a second application.

4. The method of claim 1, wherein the cloud volume block storage capacity adjustment comprises:
   identifying, by the model, at least one future time at which the application requires more cloud volume block storage than is currently provisioned; and
   provisioning, from at least one cloud volume block storage provider, a required additional capacity of cloud volume block storage within a time of the future time at which the required storage is required.

5. The method of claim 4, wherein the step of provisioning the required additional capacity of cloud volume block storage comprises:
   comparing a cloud volume block storage cost among more than one cloud volume block storage provider; and
   provisioning cloud volume block storage from the cloud volume block storage provider offering the lowest cost for the required cloud volume block storage.

6. The method of claim 1, wherein cloud volume block storage comprises a plurality of storage blocks associated with at least one virtual block storage volume,
- wherein the plurality of storage blocks comprises at least one storage block of a first capacity, and at least one storage block of a capacity different to the first capacity, and
- wherein the at least one virtual block storage volume is distributed over one or more physical disks.

7. The method of claim 6, wherein a cloud volume block storage capacity adjustment comprises removing surplus cloud volume block storage starting with the storage block containing the least stored data based on a file system analysis of the application indicating which storage blocks contain data which is no longer required.

8. The method of claim 1, wherein the reinforcement learning based predictive model is trained to predict behavior trends of the usage of storage data by the application based on a training set of time periods and data usage metrics corresponding to the set of time periods.

9. The method of claim 8, wherein an initial minimum cloud volume block storage size is provided based on the minimum cloud volume block storage needs of the application.

10. The method of claim 8, wherein the cloud volume block storage adjustment comprises:
- identifying, by the predictive model, at least one period at which the application requires less cloud volume block storage than is currently provisioned; and
- removing an excess amount of cloud volume block storage at or before the period at which the excess storage is not required.

11. The method of claim 8, wherein the cloud volume block storage adjustment comprises:
- identifying, by the predictive model, at least one future time at which the application requires more cloud volume block storage than is currently provisioned; and
- creating a required additional size of cloud volume block storage within a predetermined time of the future time at which the required storage is required.

12. A method for managing cloud volume block storage for an application, the method comprising:
- receiving at least one cloud volume block storage usage measurement of the application;
- using a reinforcement learning based predictive model, trained on storage usage for at least one other application, to identify a period for storage change;
- predicting, by the reinforcement learning based predictive model, an application programming interface (API) call response time of at least one cloud volume block storage provider to fulfil a request for cloud volume block storage capacity adjustment at a specific datacenter; and
- adjusting cloud volume block storage at or before the period.

13. A system for managing computer cloud volume block storage for a computer application, the system comprising:
- a memory; and
- a processor,
- wherein the processor is configured to:
  - calculate an optimal required cloud volume block storage capacity based on the storage needs of the application;
  - provision cloud volume block storage of the optimal capacity;
  - receive at least one cloud volume block storage usage metric of the application;
  - apply a reinforcement learning based predictive model, trained on historic data of at least one application, to identify at least one future time at which a cloud volume block storage capacity adjustment is required;
  - predict, by the reinforcement learning based predictive model, an application programming interface (API) call response time of at least one cloud volume block storage provider to fulfil a request for cloud volume block storage capacity adjustment at a specific datacenter; and
  - adjust the cloud volume block storage capacity within a time of the future time at which the block storage capacity adjustment is required.

14. The system of claim 13, wherein the processor is configured to:
- identify at least one future time at which the application requires less cloud volume block storage than is currently provisioned; and
- remove a surplus capacity of cloud volume block storage within a time of the future time at which the surplus storage is not required.

15. The system of claim 13, wherein the processor is configured to:
- identify at least one future time at which the application requires more cloud volume block storage than is currently provisioned; and
- provide a required additional capacity of cloud volume block storage within a time of the future time at which the required storage is required.

16. The system of claim 13, wherein the reinforcement learning based predictive model is trained on historic data of time periods for at least one other application.

17. The system of claim 13, wherein the processor is configured to perform at least one of: copy-on-write of data, and RAID-0 disk striping.

* * * * *